Dec. 24, 1968 P. HIGASHI ET AL 3,418,644

THIN FILM MEMORY

Filed June 10, 1964 7 Sheets-Sheet 1

Inventors.
Paul Higashi
Robert O. Gunderson
Louis A Kline
By: John J. Matlago
Nathan Cass
Their Attorneys.

Inventors.
Paul Higashi
Robert O. Gunderson

By: Louis A. Kline
John J. Matlago
Nathan Cass
Their Attorneys.

THIN FILM MEMORY

Filed June 10, 1964

Inventors.
Paul Higashi
Robert O. Gunderson

By: Louis A. Kline
John J. Matlago
Nathan Cass
Their Attorneys.

Inventors.
Paul Higashi
Robert O. Gunderson
By: Louis A. Kline
John J. Matlago
Nathan Cass
Their Attorneys.

Inventors.
Paul Higashi
Robert O. Gunderson
By: Louis A Kline
John J. Matlago
Nathan Cass
Their Attorneys.

Inventors.
Paul Higashi
Robert O. Gunderson
By: Louis A Kline
John J. Matlago
Nathan Cass
Their Attorneys.

Inventors.
Paul Higashi
Robert O. Gunderson
By: Louis A. Kline
John J. Matlago
Nathan Cass
Attorneys.

3,418,644
THIN FILM MEMORY

Paul Higashi, Gardena, and Robert O. Gunderson, Torrance, Calif., assignors to The National Cash Register Company, Dayton, Ohio, a corporation of Maryland Filed June 10, 1964, Ser. No. 373,980
15 Claims. (Cl. 340—174)

ABSTRACT OF THE DISCLOSURE

A thin film memory arrangement providing internal main memory data storage capacity for data processing systems wherein the high speed switching properties of the thin film storage elements are retained during memory accessing operations required in processing of the data stored therein. The thin film memory is formed from a number of modules or matrices, each matrix having insuffcient data storage capacity for use as an internal main memory of a data processing system. In order to retain the high speed properties of the thin film storage elements, the memory arrangement provides an improved multi-word, word line organization for reading and writing while maintaining the capability for selectively accessing any individual word location. Accordingly, a sense-digit line arrangement is operative only in the matrix or group of matrices in which the word storage access is being made while individual access to any selected work storage location is retained for separate access to each word of data for reading or writing operations in the memory.

This invention relates generally to means and methods for storing binary data, and more particularly to binary data storage means employing the high speed switching properties of magnetic thin films.

In recent years considerable progress has been made in the field of bistable thin film magnetic devices, an eminent example of which is represented by the cylindrical thin film rod disclosed in Patent applications Ser. No. 795,934, filed Feb. 27, 1959, now Patent No. 3,228,012, Ser. No. 77,451, filed Dec. 21, 1960, now Patent No. 3,213,431, and Ser. No. 268,145, filed Mar. 26, 1963, now Patent No. 3,341,829. While magnetic thin film devices are individually switchable at speeds of the order of nanoseconds, considerable difficulty has been encountered in the art in employing such thin film devices in a large size memory matrix, as would be required for example for the internal memory of a general purpose computer.

Accordingly, it is the broad object of the present invention to provide improvements in magnetic thin film memories which permit a relatively large size thin film memory to be constructed and arranged for successful operation in a digital computer.

Another object of this invention is to provide an improved memory construction and arrangement employing bistable magnetic thin film rods of the type disclosed in the aforementioned patent applications.

A further object of this invention is to provide a thin film memory construction and arrangement which is economical and practical as well as providing high speed operation.

Yet another object of this invention is to provide improved means and methods for operating a high speed thin film memory in a data processor.

A still further object of this invention is to provide an improved word organization and sense line arrangement for a high speed thin film memory.

An additional object of this invention is to provide novel logical circuit means in combination with a thin film memory for coordinating the operation of the memory with other portions of a digital computer.

Still another object of this invention is to provide a large size thin film memory capable of providing a read-write cycle time which is significantly less than one microsecond.

The specific nature of the invention as well as other objects, uses and advantages thereof will become apparent from the following description and accompanying drawings in which.

Like numerals designate like elements throughout the figures of the drawings.

Figure 1:
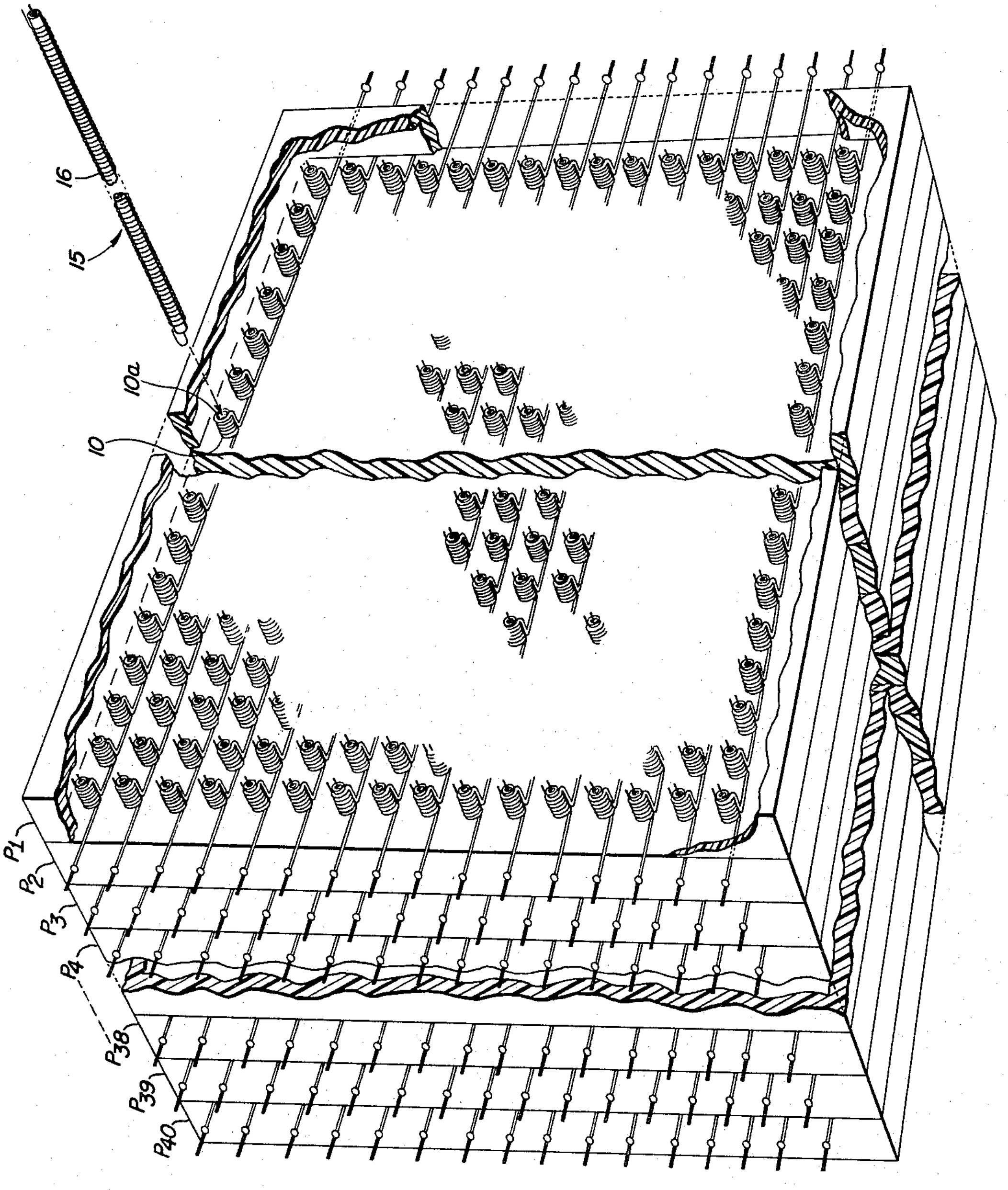
FIG. 1 is a pictorial view, partially broken away, illustrating an exemplary magnetic thin film rod memory matrix in accordance with the invention.

Referring initially to FIG. 1, illustrated therein is an exemplary magnetic thin film rod memory matrix of the same general type as disclosed in the aforementioned copending patent applications, and which is employed in the preferred embodiment of the present invention to be described herein.

The exemplary matrix of FIG. 1 typically comprises a plurality of forty stacked planes or plates $P_1$–$P_{40}$ containing sets of solenoidal windings secured in aligned fashion in the planes so as to form a row-column array of windings in each plane, with respectively located windings in different planes aligned so as to provide a continuous bore therethrough. Readily insertable and removable rod structures 15 are provided passing through these aligned bores (such as 10*a*) provided in respective aligned windings (such as 10) in respective planes.

Each of the planes $P_1$–$P_{40}$ may comprise, for example, a 65 x 16 array of windings which, in the preferred embodiment being considered herein, are designated word windings. Each word winding is formed as a solenoid 10 with a cylindrical bore 10*a* provided therein of a diameter preferably just sufficient to permit a respective thin film rod structure 15 and its associated winding 16 (which is a coaxial helical solenoid) to be passed therethrough.

Figure 2:
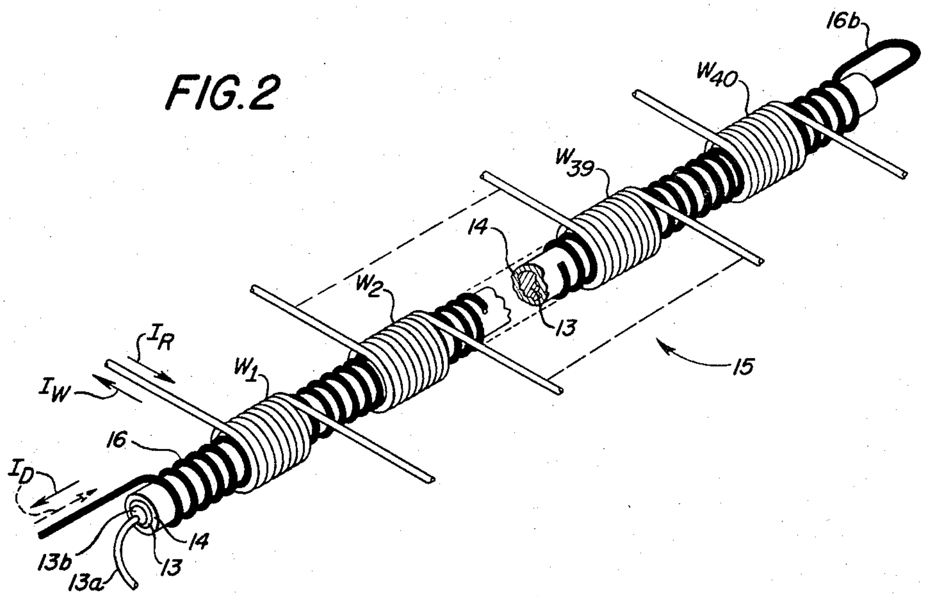
FIG. 2 is a pictorial view, illustrating a typical rod structure and its associated word windings when inserted in the matrix of FIG. 1.

Now considering FIG. 2, illustrated therein is an enlarged view of a typical rod structure 15 and the respective word windings $W_1$–$W_{40}$ associated therewith when the rod structure 15 is inserted into its respective aligned bores in the matrix of FIG. 1. Each thin film rod structure 15 is preferably comprised of a long thin rod-like inner conductive substrate 14 of beryllium copper having a diameter of about 5 to 50 mils, and on which is suitably deposited a thin film magnetic coating 14 having bistable square loop switching properties. The thin film magnetic coating 14 may typically comprise an isotropic magnetic film of approximately 97% iron-3% nickel, by weight, with a thickness of typically 4,000 angstroms, whereby the film exhibits single domain switching properties.

The coaxial helical winding 16 is wound on the rod prior to its insertion into the matrix and, in the preferred embodiment of the invention being described herein, serves as both a digit winding and a sense winding, and will therefore hereinafter be referred to as a sense-digit winding. As also illustrated in FIG. 2, the lead **16*b* at the end of the sense-digit winding 16 nearest the back of the rod structure (as viewed in FIG. 2) is connected, such as by soldering, to the back of the inner conductive substrate 14 so as to connect the sense-digit winding 16 and the substrate 14 in series. Similarly the front of substrate 14 has a wire 13*a* soldered thereto at a solder joint 13*b* so as to permit the series-connected sense-digit winding 16 and substrate 14** of the rod structure illustrated in FIG. 1 to be connected to those of other rod structures, as will be considered in more detail further on in this description.

At this point in the description, it will be helpful to consider the basic binary magnetic storage element and its mode of operation in the preferred embodiment being described herein. The basic binary magnetic storage element is the portion of the thin film magnetic coating 14 which is in the immediate vicinity of each respective word winding. For example, in FIG. 2, the magnetic thin film encompassed by word winding $W_1$ would be a typical bistable magnetic element, there being one such element for each of the other word windings on the rod structure 15 in FIG. 2.

It will be understood that the magnetic thin film 14 provided on the rod preferably has a substantially rectangular hysteresis characteristic. It will also be understood that each basic thin film magnetic element may be switched between its two states of saturation by the application thereto of suitable magnetic fields, such as produced by suitable currents applied to its respective word winding and/or sense-digit winding. The two saturation states of the basic thin film storage element may arbitrarily be designated as "1" and "0." Then, as is conventional, "reading" of data stored in a magnetic element may be accomplished by driving the element to the "0" saturation state and observing whether an output pulse is induced in the sense-digit winding 16 as a result of switching—a "1" being indicated when an output pulse is induced, and a "0" being indicated when no (or negligible) output signal is produced. As is also conventional, "writing" is caused to take place immediately after "reading," the magnetic element being left in the "0" state in which it resides after reading if a "0" is to be stored, and being driven to the "1" state if a "1" is to be stored.

In the preferred embodiment of the present invention being described herein, reading of a selected bistable thin film element is accomplished by applying a sufficient read current $I_R$ to its respective word winding (such as $W_1$ in FIG. 2) to drive the element to its "0" saturation state, while at the same time detecting whether or not a pulse is induced in the respective sense-digit winding. In order to speed up the time required for switching during reading, it is preferable to choose the read current $I_R$ flowing in the word winding of the selected bistable thin film element so that a magnetic coercive effect is produced which is significantly in excess of the minimum required for switching.

Writing into a selected thin film element is accomplished in the preferred embodiment of the present invention by the resultant effect produced by a write current $I_W$ flowing in the word winding and a digit current $I_D$ flowing in the sense-digit winding. The write current $I_W$ is applied oppositely to the direction of the read current $I_R$, and is chosen so as to apply to the selected bistable element a magnetic coercive effect of two-thirds of the magnitude required for switching the element to the "1" state. The digit current $I_D$ in the respective sense-digit winding is chosen to provide a magnetic coercive effect of one-third the magnitude required for switching. If a "0" is to be stored in the selected thin film element, the one-third coercive effect produced by the digit current $I_D$ in the sense-digit winding is chosen to be in a direction which opposes the two-thirds coercive effect produced by the write current $I_W$ flowing in the word winding, thereby producing a resultant one-third coercive effect which is insufficient for switching and causes the element to remain in the "0" state indicative of a stored "0." On the other hand, if a "1" is to be stored in the selected thin film element, then the one-third coercive effect produced by the digit current $I_D$ in the sense-digit winding is chosen to be in a direction which aids the two-thirds coercive effect produced by the write current $I_W$ flowing in the word winding, thereby producing a resultant coercive effect which switches the element to the "1" state indicative of a stored "1."

Before leaving the description of the basic rod structure and its mode of operation, an important feature of the particular embodiment of the rod structure illustrated in FIG. 2 will first be considered. It will be remembered that the sense-digit winding 16 is continuous along the rod structure 15 and is returned to the front of the rod structure by way of the inner conductive substrate 13. Such a construction has a number of important advantages. First, the use of the inner conductive substrate 13 as a return path is quite advantageous in that it can eliminate providing an additional return winding in certain cases, thereby permitting a simplication of the construction and arrangement of the matrix in such cases. In addiiton, since the digit current flows through the inner substrate 13, a transverse field is produced (that is, a circular magnetic field emanating from substrate 13) which is in addition to the axial field produced by the pitch of the sense-digit winding 16. This transverse field is, of course, less than the anisotropy field, but has the advantageous effect of reducing the amount of axial field that would ordinarily be required, and thereby permits the use of a considerably smaller digit current during the writing operation, which may typically be as much as 25% smaller.

A still further and perhaps the most important advantage of causing digit current to flow in the inner conductive substrate 13 is that the circular or transverse magnetic field produced thereby acts to cancel the circular magnetic field produced around the rod by the pitch of the sense-digit winding 16. As a result, there will be no external circular magnetic field to couple to adjacent rods, which is important since the spacing between rods in the rod matrix can now be greatly decreased so as to achieve a high packing density.

At this point it may also be noted that not only is coupling due to circular magnetic fields practically eliminated, but also, because of the relatively small diameter of the rods (that is, of the order of .010 inch), the problem of axial field coupling between adjacent rods is also very greatly reduced, since the cross-sectional area of each rod is so small that it will not couple enough of the external field produced by the solenoid of an adjacent rod to have any significant effect. Thus, it will be appreciated that the rod construction illustrated in FIG. 2 greatly reduces noise produced as a result of coupling between adjacent rods—the small diameter of the rod reducing axial field effects, and the return path for the digit current through the conductive substrate 13 reducing circular field effects.

Having described the typical rod structure 15 shown in FIG. 2, and its associated word windings $W_1$–$W_{40}$ when inserted in the matrix of FIG. 1, and having considered the mode of operation of a typical bistable thin film element, the construction and arrangement of the overall matrix of FIG. 1 will now be considered in further detail. The memory matrix organization is such that there are 65 series-connected word windings in each horizontal row (as viewed in FIG. 1) which represent 5 13-bit words in each row. Since there are 16 such rows in each of the 40 planes $P_1$–$P_{40}$ of the matrix, there are 16 x 5=80 words in each plane, and 40 x 80=3200 words in the entire 40 plane matrix.

Figure 3:
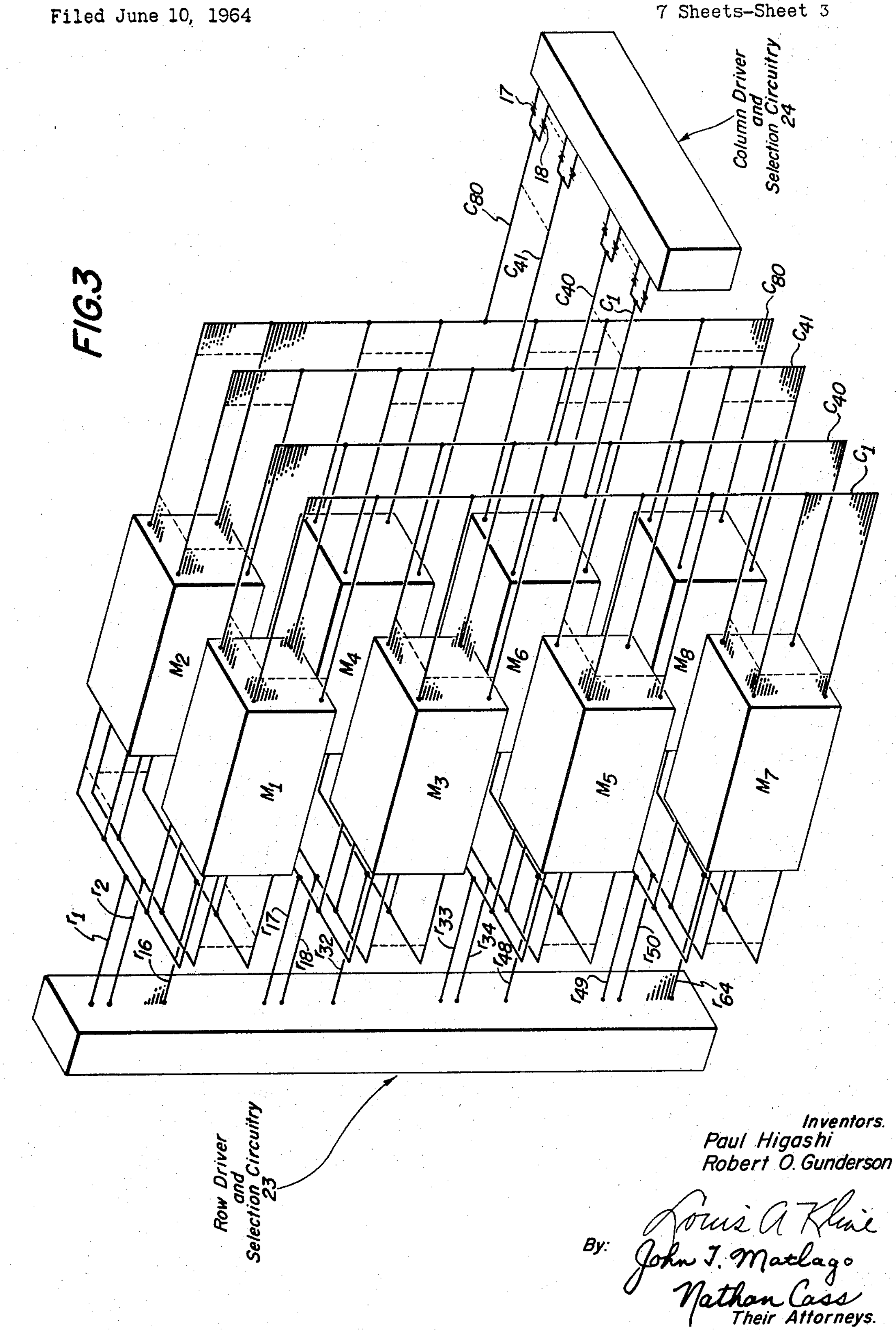
FIG. 3 is a schematic and diagrammatic view of a typical computer memory employing eight matrices of the type illustrated in FIG. 1, and showing the word line and associated linear selection connection and driving arrangement employed therewith.

In a typical data processor in which the present invention is employed, eight such matrices as illustrated in FIG. 1 are used to provide a total of 5120 word lines which represent a total word capacity of 25,600 words, since there are 5 words on each word line. Selection of a particular one of these 5120 word lines to receive read and write currents during respective read and write periods is accomplished by a conventional 64 x 80 linear selection factoring arrangement as schematically illustrated in FIG. 3. Where decimal addressing is employed for the memory, a 50 x 80 factoring arrangement would be more desirable but, in any case, the description will suffice to show how either may be provided. The connections of the sense-digit windings are omitted from FIG. 3 in order not to confuse the figure, and will be considered separately in connection with FIG. 5 later on in this description.

Thus, referring to FIG. 3, it will be understood that the 64 x 80 linear selection factoring of the word lines is accomplished by respectively connecting together the left ends (as viewed in FIG. 3) of those word lines in the matrices which are in the same row so as to form 64 row lines, while respectively connecting together the right ends (through a respective pair of diodes 17 and 18) of those word lines in the matrices which are in the same column so as to form 80 column lines. Each of the 64 row lines is connected to a respective one of 64 row drive lines $r_1$–$r_{64}$ of the row driver and selection circuitry 23, while each of the 80 column lines is connected to a respective one of the 80 column drive lines $c_1$–$c_{80}$ of the column driver and selection circuitry 24. It will be understood that such a connection of windings in linear selection fashion permits a single word line to be selected to receive current by activating the respective row and column drive lines in accordance with the row-column coordinates of the selected word line. It will also be understood that the respective pair of diodes 17 and 18 are provided in the word lines in order to prevent sneak currents from flowing in unselected lines.

Figure 4:
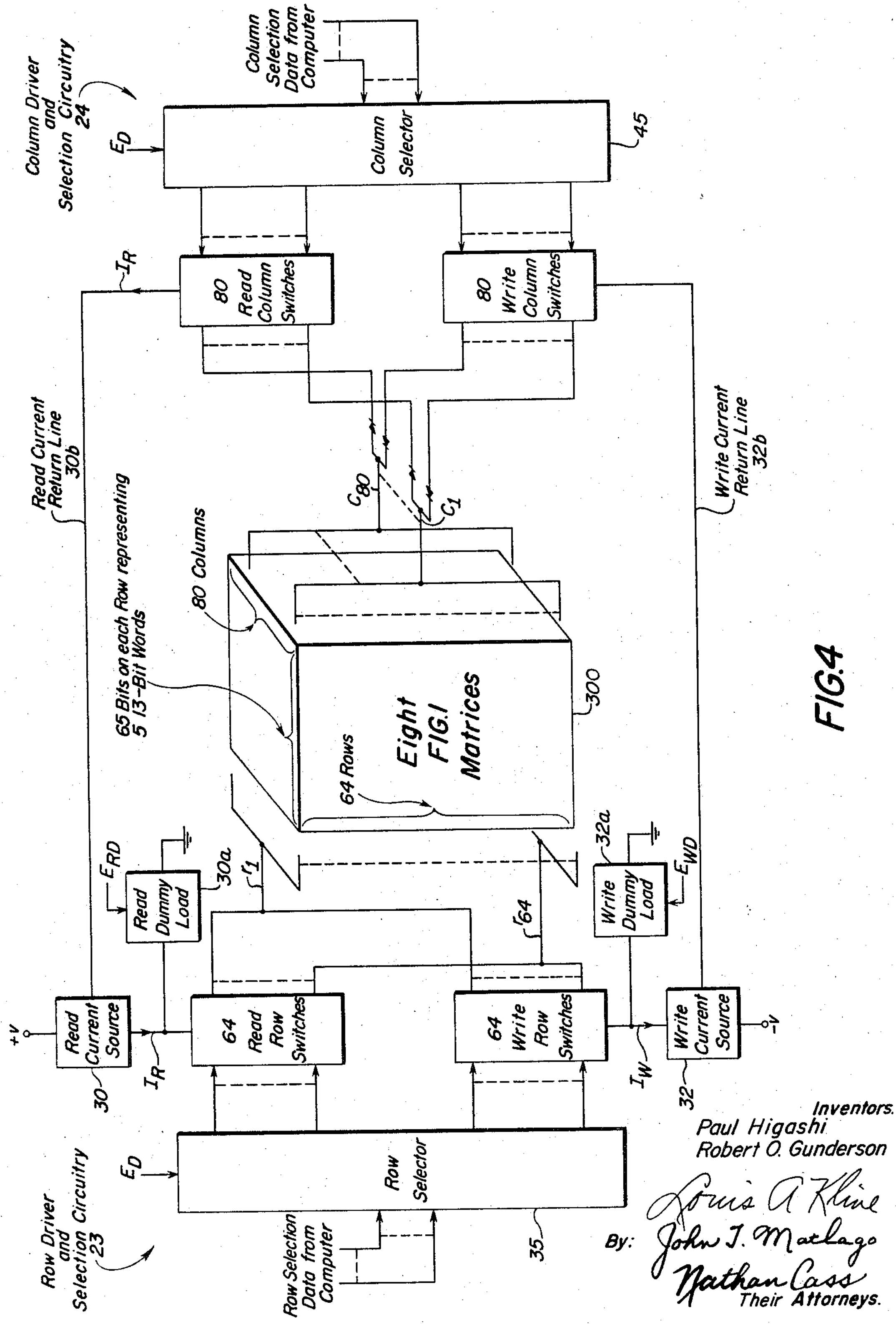
FIG. 4 is a circuit and block diagram illustrating details of the row and column driver and selector circuitry of FIG. 3.

A preferred construction and arrangement for the row driver and selection circuitry 23 and the column driver and selection circuitry 24 generally indicated in FIG. 3 is schematically illustrated in FIG. 4, which, like FIG. 3, omits the sense-digit winding circuitry for greater clarity. The eight matrices shown in FIG. 3 constituting 5120 word lines and 25,600 words are represented in FIG. 4 by the single block 300 and the row drive lines $r_1$–$r_{64}$ and the column drive lines $c_1$–$c_{80}$ in FIG. 4 correspond to the similarly designated lines in FIG. 3. In order to permit the preferred word line driving arrangement of FIG. 4 to be clearly understood, a typical reading and writing operation will be briefly described at this time insofar as it affects the application of current to the word lines. A more complete description of the overall operation of the memory will be presented later on in this description.

Thus, with reference to FIG. 4, in an early part of the reading operation, a decode signal $E_D$ is produced which is fed to a row selector 35 at the left side of the matrices and also to a column selector 45 at the right side of the matrices. In response to the decode signal $E_D$, the row selector 35 activates a particular one of 64 read row switches in accordance with row selection data provided by the computer, while the column selector 45 activates a particular one of 80 read column switches in accordance with column selection data provided by the computer. The construction and cooperative relationship of the row and column selectors 35 and 45 and their respective read and write row and column switches in FIG. 4 may typically be as disclosed in the commonly assigned copending patent application Ser. No. 91,122, filed Feb. 23, 1961, now Patent No. 3,195,114.

Shortly after the appearance of the decode signal $E_D$ which results in the activation of a particular one of the 64 read row switches and a particular one of the 80 column read row switches, a read dummy signal $E_{RD}$ is produced and applied to a read dummy load 30*a* which, in the absence of signal $E_{RD}$, normally effectively shorts out the read current $I_R$ supplied by a positive read current source 30. However, in response to the read dummy signal $E_{RD}$, the read dummy load 30*a* unshorts to permit the read current $I_R$ to be steered to the particular one of the 64 read row switches which was activated by the row selector 35. From there, the read current $I_R$ flows through the selected word line to the particular one of the 80 read column switches which was activated by the column selector 45, the selected word line being the one which corresponds to the row-column coordinates of the activated read row and read column switches. The read current $I_R$ is returned back to the read current source 30 via the read current return line 30*b*.

During the writing operation, which follows directly after the reading operation, the row and column selectors 35 and 45 act to select the same word line as was selected during reading by activating the corresponding one of the 64 write row switches and the corresponding one of the 80 write column switches which will result in the selection of the same word line as was selected during the just described reading operation. The aforementioned copending patent application Ser. No. 91,123 illustrates a preferred way in which this may be accomplished.

A short time after activation of the corresponding write row and write column switches, a write dummy signal $E_{WD}$ is produced and applied to a write dummy load 32*a* which, in the absence of signal $E_{WD}$, normally effectively shorts out the write current $I_W$ supplied by a negative write current source 32. However, in response to the write dummy signal $E_{WD}$, the write dummy load 32*a* unshorts to permit the write current $I_W$ to be steered through the activated write row switch to the activated write column switch via the same word line as was selected during reading. The write current $I_W$ is returned back to the write current source via the write current return line 32*b*.

Having described how appropriate read and write currents may be applied to a selected word line during respective reading and writing operations, the winding arrangement and associated circuitry for the sense-digit winding will next be described with reference to FIGS. 5 and 6.

Initially, it may be noted that the simplest and most direct way of interconnecting the helical sense-digit windings 16 (FIGS. 1 and 2) would be to connect together all of the sense-digit windings which correspond to the same bit of a word in the memory to a common sense amplifier and digit driver. In such a case, 13 sense-digit lines, 13 sense amplifiers, and 13 digit drivers would result respectively corresponding to the 13 bits in each word. In such a case because there are 25,600 words in the entire memory, each such sense-digit line would couple 25,600 bits. However, because of line impedances and delays, it would be highly impractical, if not impossible, to achieve high speed memory operation with so many bits coupling the same sense-digit line.

Consequently, in the preferred embodiment of the present invention being described herein, the single sense-digit line for each bit, which could be provided as indicated in the previous paragraph, is instead divided into 20 separate sense-digit lines, with the additional feature that each such separate sense-digit line does not couple bits on the same word line. Each such separate sense-digit line will then couple only 1,280 bits, and each is provided with its own sense amplifier and digit driver. This means that there will be 20 separate sense-digit lines with 20 respective sense amplifiers and digit drivers for each respective bit of the 13 bits of each word in the memory, and a total of 260 such sense-digit lines with 260 respective sense amplifiers and digit drivers for the entire memory.

As will become evident hereinafter, the complexities associated with such a division of sense-digit lines into separate smaller sense-digit lines are mitigated to a considerable extent by having each sense-digit line couple bits on different word lines, by reading out all of the words on the same word line at once, and by providing appropriate associated logic for controlling and selecting the data read from and to be written into the memory in accordance with the cyclic significance given to memory operation by the data processor, whereby the driving circuitry required is considerably reduced over what would otherwise be necessary.

Figure 5:
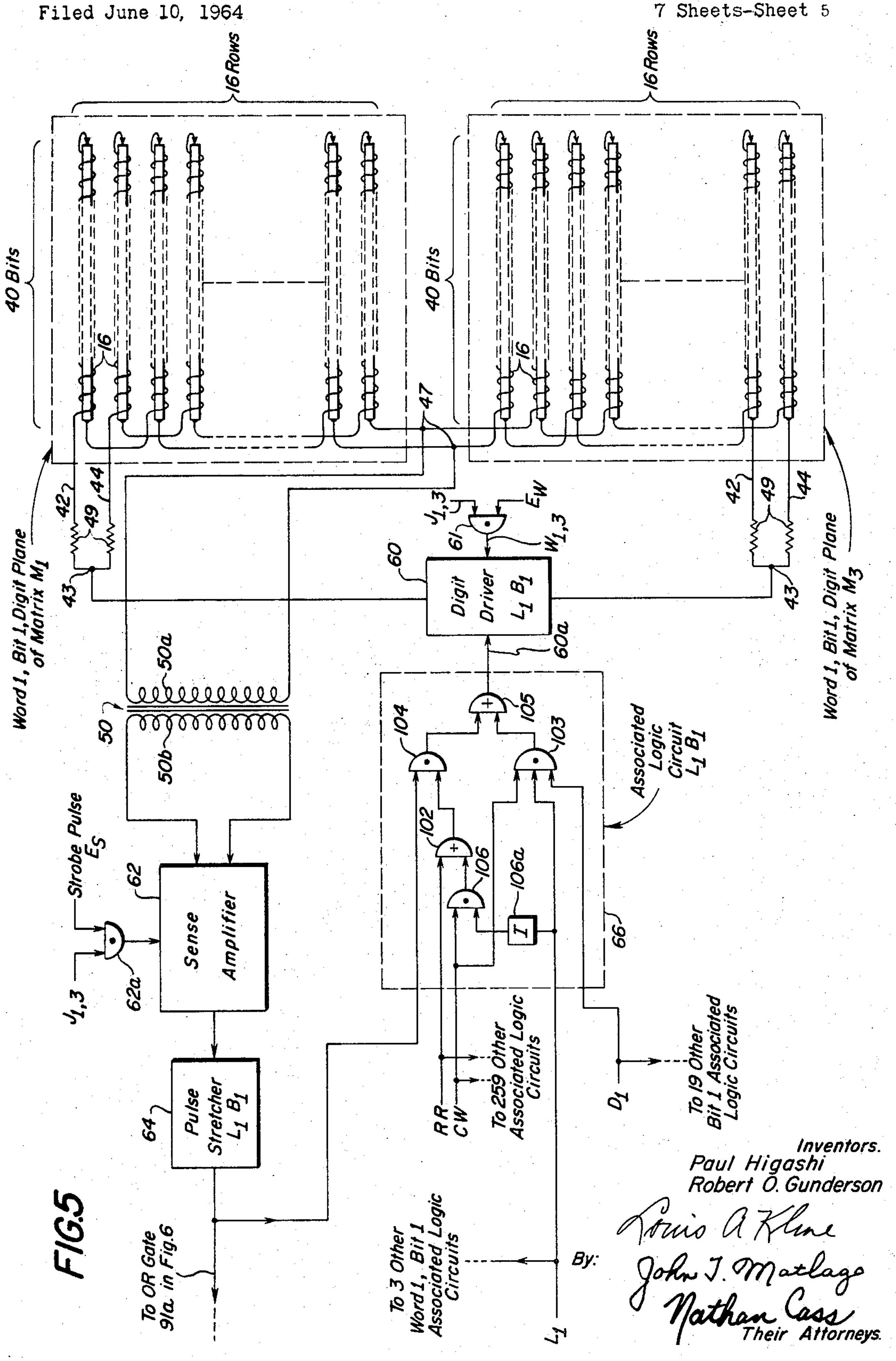
FIG. 5 is a circuit and block diagram illustrating the connection and circuit arrangement for the word 1, bit 1 sense-digit line and associated circuitry.
Figure 6:
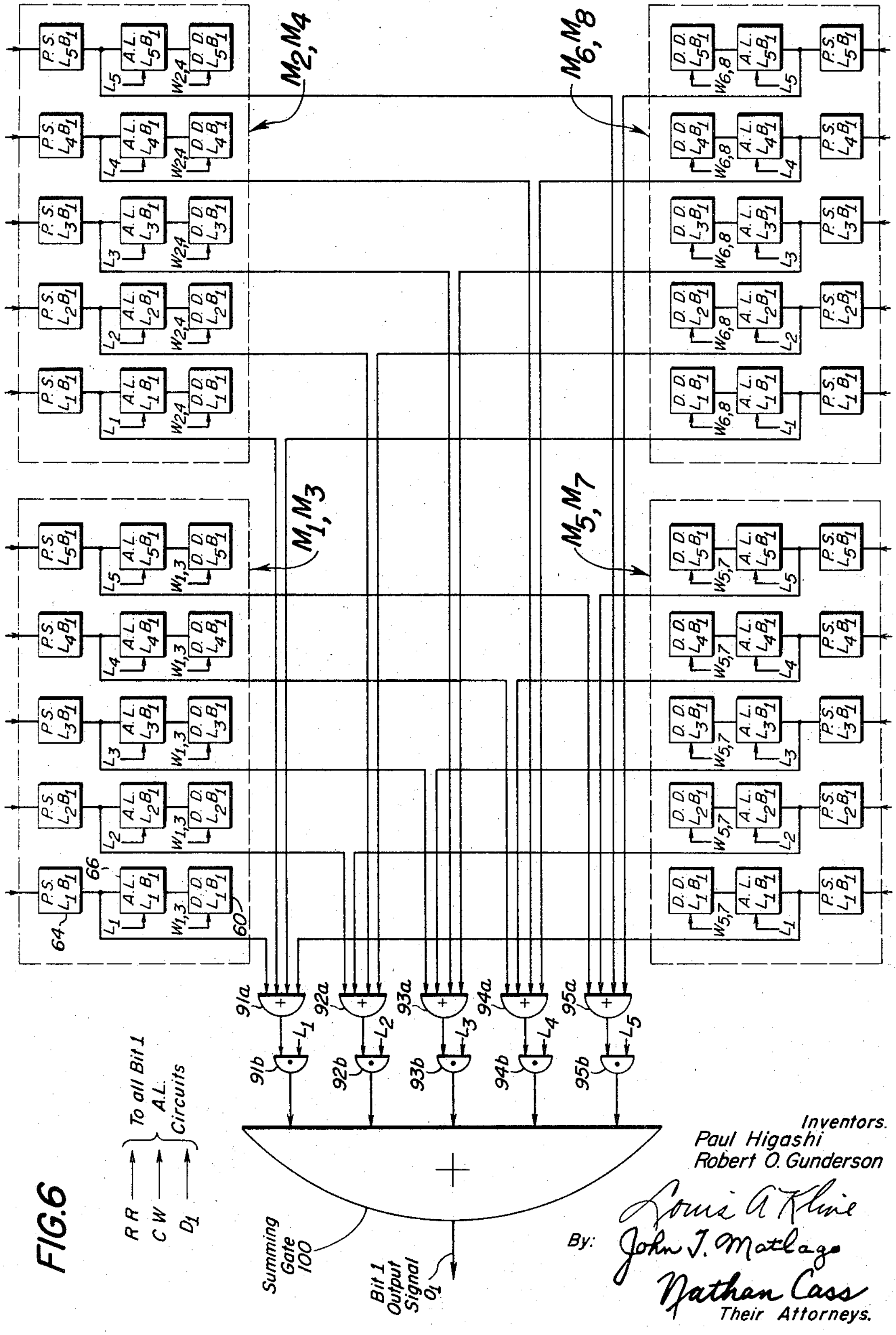
FIG. 6 is a circuit and block diagram illustrating the connection and overall logical arrangement of the twenty bit 1 sense-digit circuits.

Referring now to FIGS. 5 and 6, illustrated therein is a preferred connection arrangement for the sense-digit windings and the sensing, driving and logic circuitry associated therewith. Specifically, FIG. 5 shows the sense-digit winding interconnection arrangement and associated circuitry for an exemplary one of the 260 sense-digit lines in the memory, namely the word 1, bit 1 sense-digit line for matrices $M_1$ and $M_3$. The word windings are omitted in FIG. 5 for the sake of clarity. Since all of the sense-digit lines of matrices $M_1$ and $M_3$ are formed in the manner illustrated in FIG. 5, the exemplary showing therein will suffice to disclose the manner of formation of all of the 65 such sense lines (one for each bit in a row) in matrices $M_1$ and $M_3$. Also, it will be understood from FIG. 3 that matrices $M_2$ and $M_4$, $M_5$ and $M_7$, and $M_6$ and $M_8$ may be paired in the same manner as illustrated for matrices $M_1$ and $M_3$ in FIG. 5 in providing the remaining 195 of the 260 total sense lines in the memory. There will thus be a total of 260 such circuit arrangements in the memory, as typically shown in FIG. 5.

Now considering FIG. 5 in more detail, a sense-digit winding connection arrangement is employed so as to achieve what is conventionally referred to in the art as common mode noise rejection, whereby much of the noise in the system is cancelled. More specifically, as shown in FIG. 5, the sense-digit windings 16 on rods in odd rows are all connected in series to form a first series-connected line 42, while the sense-digit windings 16 on rods in even rows are all connected in series to form a second series-connected line 44. Resistors 49 serve as line terminating resistors and are chosen so as to eliminate reflections. In providing the interconnection of sense-digit windings illustrated in FIG. 5, the center substrate of each rod is used as a return path for its respective sense-digit winding, as previously explained in connection with FIG. 2.

Still referring to FIG. 5, it will be seen that the terminating resistors 49 at the ends of the series-connected lines 42 and 44 are connected together to form junctions 43 between which a digit driver 60 is connected. Also, a junction 47 is provided in the middle of each of lines 42 and 44 between matrices $M_1$ and $M_3$, which junctions 47 are connected to opposite sides of the primary winding 50*a* of a sense amplifier transformer 50. The resulting symmetry obtained by such a sense-digit winding connection arrangement serves during reading to cancel out common mode noise (such as caused by capacitive coupling between the word windings and the sense-digit windings), while permitting any output signal induced in a sense-digit winding as a result of the switching of a magnetic element to be passed through the transformer 50 and fed to a respective sense amplifier 62. During writing, the common mode connection of the sense-digit windings serves to cancel out signals produced across the transformer 50 by the flow of digit current from the digit driver 60, so that the sense amplifier 62 will not be overdriven to an extent which will prevent its recovering in time for the next reading operation.

The sense amplifier 62 indicated in block form in FIG. 5 is preferably of the same general type as disclosed in the commonly assigned copending patent application Ser. No. 157,899, filed Dec. 8, 1961, now patent No. 3,211,921, in which tunnel diode discrimination elements are used in conjunction with a differential amplifier circuit arrangement to provide for the amplification and detection of bipolar signals in response to the application of an appropriate strobe pulse occurring during the reading operation. It will be noted in FIG. 5 that the strobe pulse is applied to the sense amplifier 62 through AND gate 62*a* to which the signal $J_{1,3}$ is also applied. The signal $J_{1,3}$ is derived from an address register (FIG. 7), and will be at a true logical level during a reading or writing operation only if the selected word is in matrix $M_1$ or $M_3$. The sense amplifier 62 is thus conveniently prevented from operating when its respective matrices $M_1$ and $M_3$ do not contain the selected word. It will be understood that like signals $J_{2,4}$, $J_{5,7}$ and $J_{6,8}$ are respectively provided for the other three matrix pairs $M_{2,4}$, $M_{5,7}$ and $M_{6,8}$ for a similar purpose. It will also be understood that the sense amplifier 62 is designed to respond to bipolar pulses, since the sense winding connection arrangement of FIG. 5 is such that the two series lines 42 and 44 will apply thereto output signals of opposite polarity.

The pulse stretcher 64 in FIG. 5 may be of conventional form, such as a blocking oscillator, and its purpose is to receive an output pulse from the sense amplifier 62 and to shape and stretch the pulse so as to be capable of logical combination with other signals during both reading and writing, a true logical level signal being produced in response to a sense amplifier output signal, and a false logical level signal being produced otherwise. The digit driver 60 in FIG. 5 may also be of conventional form and supplies no digit current until the signal $W_{1,3}$ is applied thereto, which signal $W_{1,3}$ will occur only during writing (when signal $E_W$ is produced) and only if the selected word is in either matrix $M_1$ or $M_3$ (as indicated by signal $J_{1,3}$ being at a true logical level). When signal $W_{1,3}$ occurs, the digit driver 60 operates to provide digit current $I_D$ during writing in either one direction or the other—that is, either in opposition to the write current $I_W$ or in support of the write current $I_W$, depending on whether a "0" or a "1" is to be written into the selected bit, as previously described when the basic mode of operation was discussed in connection with FIG. 2. The direction of digit current flow produced by the digit driver 60 when signal $W_{1,3}$ appears is determined by whether a true or a false logical level signal is present on input 60*a*, which is in turn determined by the respective associated logic circuit 66 whose specific construction and operation will be considered later on herein.

Referring now to FIG. 6, illustrated therein is the connection and overall logical arrangement for bit 1, which includes the bit 1 circuitry for all four of the matrix pairs $M_1$ and $M_3$, $M_2$ and $M_4$, $M_5$ and $M_7$, and $M_6$ and $M_8$. Each matrix pair has five separate bit 1 sense-digit circuits respectively corresponding to the five words provided on each row of each matrix pair, thereby providing a total of 20 bit 1 sense-digit circuits, each as typically illustrated in FIG. 5. It will be understood that the sense-digit circuits for each of the other 12 bits of the words in the memory may be arranged in the same way as illustrated in FIGS. 5 and 6 for bit 1, so that the description of FIGS. 5 and 6 with respect to bit 1 will suffice for all other bits.

Considering FIG. 6 in more detail, it is to be noted that only the pulse stretcher (abbreviated P.S.), the associated logic circuit (abbreviated A.L.) and the digit driver (abbreviated D.D.) are shown for each of the 20 bit 1 sense-digit circuits; the remaining portions of each may be provided as already illustrated for the word 1, bit 1 sense-digit circuit in FIG. 5. The pulse stretcher 64, the associated logic circuit 66 and the digit driver 60 of the word 1, bit 1 sense-digit circuit illustrated in FIG. 5 are given the same numerical designations in FIG. 6 as in FIG. 5, for ready comparison.

It is also to be noted that the "LB" designations in FIG. 6 serve to identify the particular word and bit to which each pulse stretcher, associated logic circuit and digit driver shown therein corresponds; the "B" subscripts in FIG. 6 are all "1" since only the bit 1 circuitry is shown therein, and the "L" subscripts represent the particular word in the row to which each unit corresponds. Accordingly, the word 1, bit 1 pulse stretcher 64, associated logic circuit 66 and digit driver 60 in the matrix pair $M_1$, $M_3$ are given the designation $L_1B_1$ in FIGS. 5 and 6, as also are the word 1, bit 1 units for the other matrix pairs. Following the pattern set out above the word 2, bit 1 units are designated $L_2B_1$ in FIG. 6, the word 3, bit 1 units $L_3B_1$, the word 4, bit units $L_4B_1$, and the word 5, bit 1 units $L_5B_1$.

Figure 7:
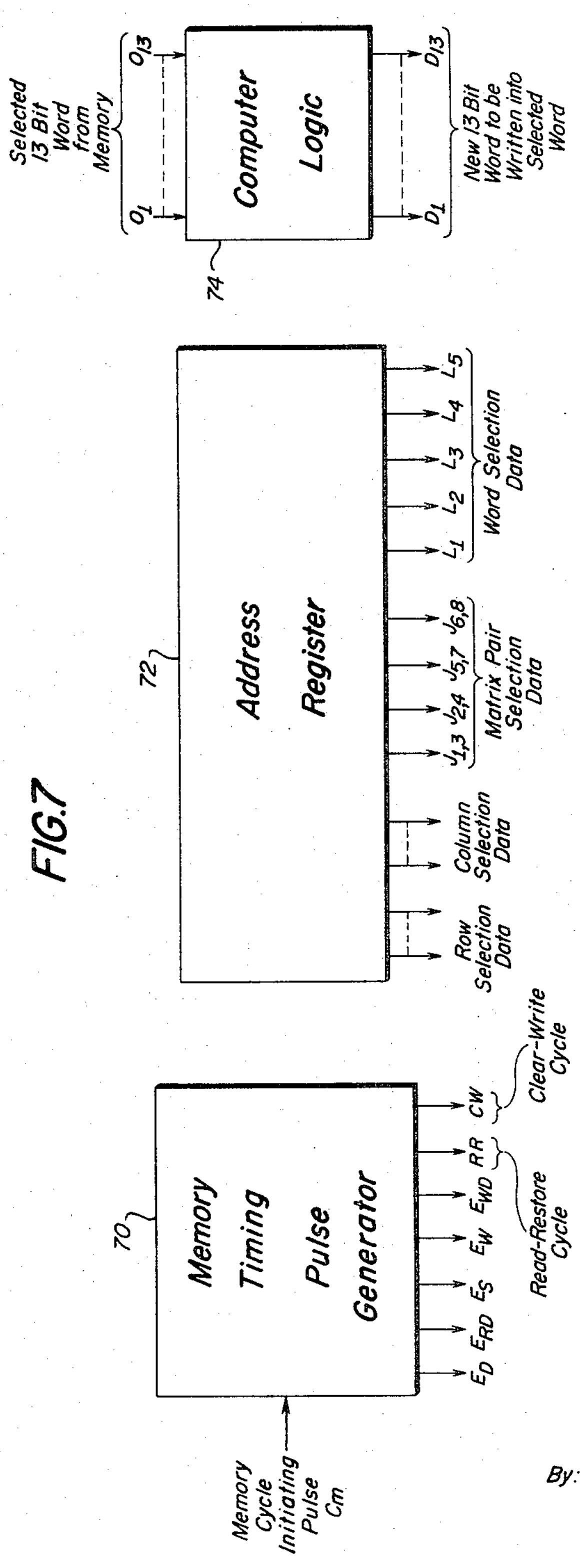
FIG. 7 is a block diagram illustrating pertinent computer portions from which signals are provided for use by the memory of FIG. 3.

The construction and operation of the bit 1 sense-digit circuit arrangement of FIG. 6, as well as the detailed construction and operation of each associated logic circuit as exemplified in detail in FIG. 5, will become evident from the following description of the operation occurring during a typical memory cycle. For this purpose, reference will also be made to FIGS. 7 and 8. FIG. 7 illustrates pertinent computer portions from which signals are derived for use in memory operation, and FIG. 8 is a timing diagram illustrating the time relationship between various memory signals empolyed during a memory cycle.

Figure 8:
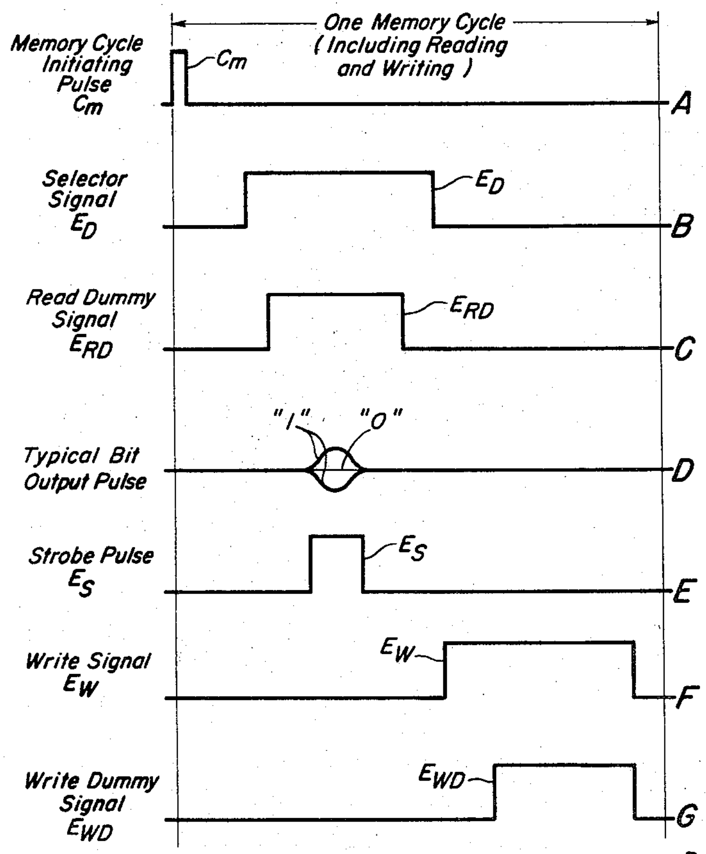
FIG. 8 is a timing diagram, illustrating the time relationship between various memory signals employed during a memory cycle.

Thus, referring to FIGS. 7 and 8, the memory cycle is initiated by a memory cycle initiation pulse $C_m$ which is applied to a memory timing pulse generator 70 (FIG. 7), which may preferably be of the delay line type disclosed in the commonly assigned copending application Ser. No. 107,109, filed May 2, 1961. A short time after the memory initiation pulse $C_m$ is applied to the memory timing pulse generator 70, the selector signal $E_D$ is produced thereby, which is applied to the row and column selectors 35 and 45 in FIG. 4. As a result, the row selector 35 selects a particular one of the 64 read row switches, while the column selector 45 selects a particular one of the 80 read column switches, the particular switches selected being determined by row selection and column selection data derived from an address register 72 (FIG. 7).

As illustrated in the timing diagram of FIG. 8, a short time after the occurrence of the selector signal $E_D$, a read dummy signal $E_{RD}$ is produced by the pulse generator 70 (FIG. 7) which is applied to the read dummy load 30*a* in FIG. 4 to unshort the read current source 30 and cause a read current $I_R$ to flow through the selected word line, via the read row switch and the column row switch selected by the row and column selectors 35 and 45 in response to the selector signal $E_D$.

The read current $I_R$ flowing through the selected word line causes all 65 magnetic elements or bits coupled to the selected word line to receive a coercive magnetic effect sufficient to drive each to the "0" saturation state if a "1" is stored therein. Thus, each magnetic element in the selected word line which stores a "1" will induce an output pulse into its respective sense-digit winding, as typically illustrated in FIG. 8 by the pulses designated "1" in graph D, while each magnetic element which stores a "0" will induce no output pulse (or only a negligible one) into its respective sense-digit winding as illustrated by the designation "0" in graph D of FIG. 8.

For the purposes of this description it will be assumed that the selected word line is the one which would be selected by activattion of the uppermost read row switch connected to row drive line $r_1$ in FIGS. 3 and 4 and the leftmost read column switch connected to column drive line $c_1$ in FIGS. 3 and 4. This means that the selected word line will be in matrix $M_1$ so that the signal $J_{1,3}$ from the address register 72 and corresponding to the matrix pair $M_1$, $M_3$ will be true, while the other matrix pair signals $J_{2,4}$, $J_{5,7}$ and $J_{6,8}$ will be false. It will further be assumed that the particular one of the 5 words on the selected word line which is to be ultimately selected is the first word on the row, in which case the signal $L_1$ from the address register 72 and corresponding to the first word on each row will be true, while signals $L_2$, $L_3$, $L_4$ and $L_5$ corresponding to other words on each row will be false.

In view of the assumptions made in the previous paragraph, the top rod in the word 1, bit 1 digit plane of matrix $M_1$ illustrated in FIG. 5 will contain the magnetic element corresponding to bit 1 of the selected word on the selected word line. Thus, if the selected word 1, bit 1 magnetic element stores a "1," the read current $I_R$ flowing through its respective word line will switch the element back to the "0" saturation state, causing an output pulse to be induced in the series-connected line designated 42 in FIG. 5. This output pulse will pass via transformer 50 to the sense amplifier 62 which is activated by the strobe pulse $E_S$, as illustrated in graph E in FIG. 8, since the signal $J_{1,3}$ derived from the address register 72 is true as a result of the selected word being in matrix $M_1$. The amplified output pulse appearing at the output of the sense amplifier 62 in FIG. 5 is then fed to the pulse stretcher 64 where a true logical level signal is produced in response to a sense amplifier output pulse, and a false logical level signal otherwise.

Now referring to FIG. 6 along with FIG. 5, the description will continue in detail only with respect to the circuitry for bit 1, it being understood that operation with respect to the circuitry for each of the other 12 bits occurs in a similar manner. From the description so far it will be evident that, as a result of the read current being applied to the selected word line which is assumed to be in matrix $M_1$, only the pulse stretchers P.S. of the matrix pair $M_1$, $M_3$ will be of interest, since the word lines of other matrix pairs receive no read current and therefore induce no output signals into their respective sense-digit lines. In any case, the strobe pulses of the pulse stretchers of all other matrix pairs besides $M_1$, $M_3$ will be prevented from activating their respective sense amplifiers (as typically illustrated in FIG. 5) because their respective matrix selection signals $J_{2,4}$, $J_{5,7}$ and $J_{6,8}$ will be false. It will, of course, be understood that if any of the other three matrix pairs were to contain the selected word line, operation would be the same as will now be described for the matrix pair $M_1$, $M_3$.

Thus, referring to FIG. 6 and matrix pair $M_1$, $M_3$ in particular, it will be understood that the true and false states of the outputs of the five $M_1$, $M_3$ pulse stretchers (P.S. $L_1B_1$, P.S. $L_2B_1$, P.S. $L_3B_1$, P.S. $L_4B_1$, and P.S. $L_5B_1$) during the presence of the strobe pulse $E_s$ in graph E of FIG. 8 will represent the data stored in the 5 bit 1 magnetic elements of the 5 words on the selected word line. To select the bit 1 pulse stretcher output which corresponds to the selected word, each is fed to a summing gate 100 via a respective one of the OR gates 91*a* to 95*a* and a respective one of the AND gates 91*b* to 95*b* in FIG. 6. Each such respective OR gate-AND gate pair corresponds to a respective one of the 5 words on each row, as indicated by the signals $L_1$, $L_2$, $L_3$, $L_4$ and $L_5$ (representing which of the 5 words on the selected word line is to be selected) being applied to respective AND gates 91*b* to 95*b*. It will be noted that, similarly to the matrix pair $M_1$, $M_3$, the pulse stretcher outputs from the other matrix pairs are likewise fed to respective ones of the OR gates 91*a* to 95*a* in accordance with the word in the row to which it corresponds, as indicated by its "L" subscript.

Since it has been assumed that the selected word is the first word in the row, word selection signal $L_1$ will be true, while word selection signals $L_2$, $L_3$, $L_4$ and $L_5$ are all false. Consequently, only AND gate 91*b* will be enabled to permit the bit 1 word 1 output signal from pulse stretcher 64 to be passed to the summing gate 100, which is in turn fed to the computer for use thereby. In other words, under the assumed conditions, the combination of the matrix selection signal $J_{1,3}$ and the word selection signal $L_1$ has restricted the resultant bit 1 output signal $O_1$ appearing at the output of the summing gate 100 to that produced by the word 1, but 1 magnetic element, while ignoring any other bit 1 signals which may have been induced in the bit 1 sense-digit windings of the other four unselected words on the selected word line in the selected matrix $M_1$.

Thus, if a "1" is stored in the word 1 bit 1 magnetic element of matrix $M_1$, a true output signal appears at the output of pulse stretcher 64 which passes through OR gate 91*a* and AND gate 91*b* (enabled by $L_1$ being true) to cause a true logical level signal to be produced at the output of the summing gate 100 in FIG. 6. On the other hand, if a "0" is stored in the word 1, bit 1 magnetic element, a false output signal appears at the output of pulse stretcher 64, inhibiting AND gate 91*b* and causing a false logical level signal to be produced at the output of the summing gate 100.

From the above explanation of the manner in which the bit 1 output signal $O_1$ of the selected word is uniquely obtained during reading as a result of the operation of the circuitry of FIG. 6 (even though all 5 bit 1 magnetic elements corresponding to the 5 words on the selected row are read out during reading), it should also be evident how the output signals for all of the other 12 bits $O_2$–$O_{13}$ of the selected word are uniquely obtained in a similar manner using a respective circuit similar to FIG. 6. There will thus be 13 such circuit arrangements as illustrated in FIG. 6, one for each of the 13 bits in each word which will produce the 13 bits $O_1$–$O_{13}$ fed to the computer logic 74 (FIG. 7) during the reading operation.

Next to be considered is the writing operation occurring during the typical memory cycle illustrated in FIG. 8. Initially, it is important to note that, in accordance with the invention, two types of computer operations can occur concurrently with a memory cycle. One type of operation is a read-restore operation for which it is required that the same data read out of the selected word in the memory and fed to the computer during the read portion of a memory cycle be written back into the memory during the write portion of the memory cycle. The other type of computer operation is a clear-write operation for which it is required that different data be written back into the selected word in the memory during the write portion of the memory cycle than was read therefrom during the read portion of the memory cycle. Which of these two types of computer operations is to take place during a memory cycle is made known by having the memory timing pulse generator 70 in FIG. 7 produce a true logical level signal RR during the write portion of a memory cycle if a read-restore cycle is to take place, or a true logical level signal CW during the write portion of a memory cycle if a clear-write cycle is to take place. The manner in which these signals RR and CW are used to determine the particular binary data to be written back into the memory during the write portion of the cycle will now be described.

In considering the writing operation, it is important to recognize that, even though only the 13 bits $O_1$–$O_{13}$ of the selected word read out during the read portion of the cycle are ultimately caused to be fed to the computer logic 74 (FIG. 7), nevertheless, all 65 magnetic elements on the selected row line will have been driven to the "0" saturation during the reading operation and will, therefore, reside in the "0" state after reading is completed. It is thus necessary, in providing the operations required for the read-restore and clear-write cycles with respect to the 13 magnetic elements of the selected word, to also provide for writing back into the remaining 52 unselected elements on the selected row the same data as was read therefrom.

The read-restore type of memory cycle will be considered first, since it involves the same type of restoring operation for both selected and unselected elements on the selected row. With reference to FIG. 5, it will be understood that the read-restore operation to be described with respect to FIG. 5 occurs in a like manner for all 65 magnetic elements on the selected row. Thus, it will be understood with reference to FIG. 5 that when the read-restore signal RR becomes true during the write portion of the memory cycle, it will pass through an OR gate 102 of the associated logic circuit 66 to enable an AND gate 104. As a result, if the output of the pulse stretcher 64 is true as a result of a "1" having been read out from its respective magnetic element in the selected word line during the read portion of the memory cycle, then this true pulse stretcher output signal (which is caused to have a pulse width sufficient to remain present during the write portion of the memory cycle) will pass through the AND gate 104 enabled by the read-restore signal RR, and through OR gate 105 to make the input 60*a* of the digit driver 60 true. Then, when the write signal $E_W$ (graph F in FIG. 8) is generated by the memory generator 70 (FIG. 7) during the write portion of the memory cycle, the digit driver 60 will be activated (since matrix selection signal $J_{1,3}$ is also true) and, in response to the true signal on its input 60*a*, will cause a digit current $I_D$ to be produced in a direction which will aid the write current $I_W$.

As explained previously in connection with FIG. 4, the row and column selectors 35 and 45 act during writing to select a respective write row switch and a respective write column switch so that, when the write dummy signal $E_{WD}$ (graph G in FIG. 8) unshorts the write dummy load 32*a* from the write current source 32 in FIG. 4, a write current $I_W$ will flow through the same word line as was selected during reading. As a result, the write current $I_W$ in the selected row in conjunction with the aiding digit current $I_D$ produced by the digit driver 60 in FIG. 5 will write back into the respective magnetic element the same "1" that was read out therefrom during reading.

Of course, if a "0" was previously stored in the respective magnetic element, then the pulse stretcher output remains false during writing, causing a false signal to appear on digit driver input 60*a*. In such a case, an opposing digit current is produced by the digit driver 60 which prevents switching of the respective magnetic element, thereby maintaining the "0" stored therein prior to reading. It will be understood that, because the digit current (whether in an aiding or an opposing direction) produces a magnetic coercive effect of only one-third the amount required for switching, unselected magnetic elements on the same sense-digit line as the selected one will remain undisturbed.

Having described a read-restore type of memory cycle, a clear-write type of memory cycle will now be described. As explained previously, a clear-write memory cycle is one in which new data, indicated by signals $D_1$–$D_{13}$ at the output of the computer logic 74 in FIG. 7, is to be written back into the selected word of the selected word line, rather than merely restoring the previously read data as in a read-restore cycle. In such a case the read portion of the memory cycle occurs in the same manner as during a read-restore memory cycle. However, during the write portion of a clear-write cycle, the clear-write signal CW from the memory timing pulse generator 70 in FIG. 7 now becomes true (instead of the read-restore signal RR), and, together with the word selection signals $L_1$, $L_2$, $L_3$, $L_4$ and $L_5$ from the address register 72, provide for the appropriate operation of each associated logic circuit, as will now be explained.

Thus, returning again to the exemplary sense-digit circuit in FIG. 5, it will be seen that the clear-write signal CW, the word selection signal $L_1$, and the new bit 1 data signal $D_1$ are all applied to an AND gate 103 in the associated logic circuit 66 of FIG. 5. Since the respective magnetic element in the FIG. 5 circuit corresponds to bit 1 of the selected word on the selected word line, the word selection signal $L_1$ will be true. Therefore, when the clear-write signal CW becomes true during the write portion of the memory cycle, the new bit 1 data signal $D_1$ can pass through AND gate 103 and OR gate 105 to the digit driver to cause the new bit 1 data to be written into the respective bit 1 magnetic element of the selected word on the selected word line. It will be noted that AND gate 104 remains inhibited so as to prevent the output of the pulse stretcher 64 (which contains the previous bit 1 data read out during the read portion of the cycle) from being applied to the digit driver 60. AND gate 104 is inhibited because both signal RR and the output of AND gate 106 fed thereto via OR gate 102 are false. The output of AND gate 106 is false, since word selection signal $L_1$ (which is true because the respective magnetic element is part of the selected word) is applied to AND gate 106 through inverter **106*a* which results in a false signal being applied to AND gate 106. It will be understood that all of the other 12 new bits $D_2$ to $D_{13}$ are written into respective magnetic elements of the selected word in the same manner as just described for bit 1. It will also be understood that if it were desired to prevent the output signals $O_1$–$O_{13}$ from being fed to the computer logic 74 in FIG. 7 during a clear-write operation, the read-restore signal RR could be caused to be present during reading and applied to AND gates 91*b* to 95*b*** in FIG. 6 to permit the output signals $O_1$–$O_{13}$ to be obtained during reading only during a read-restore cycle.

Having explained how the new data signals $D_1$–$D_{13}$ are written into their 13 respective magnetic elements of the selected word in the selected word line during a clear-write cycle, it will now be explained how magnetic elements of unselected words in the selected word line are handled. It will be remembered that even though such unselected magnetic elements on the selected word line are not ultimately required to be fed to the computer, they nevertheless are driven to the "0" saturation state during reading. It is thus necessary to rewrite the same data read out from the unselected magnetic elements during the read portion of the memory cycle back into each respective magnetic element during the write portion of the memory cycle. The manner in which this is accomplished will be explained with reference to FIG. 5 by assuming that word selection signal $L_1$ is false, as would be the case for those sense-digit circuits of unselected magnetic elements on the selected word line.

It will thus be understood that the false state of signal $L_1$ will then act to inhibit AND gate 103 to prevent the new data signal $D_1$ from passing therethrough. On the other hand, the false signal $L_1$ after inversion by the inverter **106*a* will apply a true signal to AND gate 106. Since CW is also true, a true signal will appear at the output of AND gate 106 and will pass through OR gate 102 to enable AND gate 104. As a result, the output of the pulse stretcher 64 will be applied to the digit driver via AND gate 104 and OR gate 105** to write back into the respective unselected magnetic element in the selected word line the same data as was read therefrom during the read portion of the memory cycle. It will be understood that all of the other unselected magnetic elements will have the same data written back during a clear-write cycle in the same manner as just described.

One further point to note with respect to the writing operation, generally, is that only the digit drivers in the selected matrix pair $M_1$, $M_3$ are activated to operate during writing. This is the case because only for these digit drivers of matrices $M_1$ and $M_3$ will the respective matrix selection signal $J_{1,3}$ be true, which is necessary as typically illustrated in FIG. 5, since the matrix selection signal $J_{1,3}$ is applied to the digit driver AND gate 61 along with the write signal $E_W$ to form the digit driver activation signal $W_{1,3}$.

A large size thin film memory constructed and arranged in accordance with the present invention as described above is capable of providing a read-write cycle time which is significantly less than one micro-second.

While the foregoing disclosure has been primarily concerned with a particular illustrative embodiment, it is to be understood that the invention is susceptible of many modifications in construction and arrangement as well as a variety of related uses. The present invention, therefore, is not to be considered as limited to the specific disclosure provided herein, but is to be considered as including all modifications and variations coming within the scope of the invention as defined in the appended claims.

What is claimed is:

1. A thin film magnetic memory comprising in combination: a plurality of individual three-dimensional matrices, each matrix being provided with a plurality of array solenoidal windings disposed in aligned fashion in a plurality of planes so as to form a three-dimensional array of windings in which the bores of respectively located windings in different planes are aligned and provide a continuous bore therethrough, each matrix also including a plurality of rod structures, each rod structure passing tightly through the continuous bore formed by a respective group of aligned windings and having a continuous bistable thin film provided thereon having single domain switching properties and a rod solenoidal winding wound therealong, conductive means interconnecting said array solenoids in all of said matrices including interconnecting array solenoids of different ones of said plurality of matrices in a first predetermined pattern and said rod solenoids in all of said matrices in a second predetermined pattern so as to form a composite memory arrangement of said plurality of matrices interconnected in said first and second predetermined patterns of array solenoids and rod solenoids in which predetermined portions of the thin films on said rod structures serve as bistable storage elements, selectively operable driving means coupled to one of said predetermined patterns for magnetically switching predetermined ones of said thin film portions in any of said matrices, and output means coupled to the other of said predetermined patterns for reading out signals induced in said windings as a result of switching.

2. A high speed memory comprising: a plurality of bistable elements each having a substantially square-loop hysteresis-type characteristic and being capable of high speed switching from one bistable state to the other, or vice versa, in response to appropriately directed coercive effects applied thereto, each bistable element being provided with coercing means capable of switching the element and output means responsive to said switching, selectively operable means coupled to said coercing means so as to permit applying a coercive effect sufficient to switch a selected plurality of said bistable elements constituting a plurality of multi-bit words to one bistable state during a reading operation and selected ones of the same selected plurality of said bistable elements to the other bistable state during a writing operation following thereafter while causing the states of unselected bistable elements to remain undistributed during such reading and writing operations, means coupled to said output means for selecting predetermined ones of the outputs thereof corresponding to a selected one of the words in the selected plurality of bistable elements, and means also coupled to said coercing means for causing bistable elements of unselected words in said selected plurality of bistable elements to be returned during said writing operation to the same bistable state in which they resided prior to said reading operation while permitting bistable elements of the selected word in said selected plurality of bistable elements to either be returned during said writing operation to the same bistable state in which they resided prior to said reading operation or to have new data written therein.

3. The invention in accordance with claim 2, wherein said bistable elements are formed of a magnetic thin film having a thickness sufficiently small so that the thin film exhibits single domain switching properties.

4. A thin film magnetic memory comprising in combination: a plurality of thin film magnetic bistable elements each having a substantially square-loop hysteresis characteristic, winding means coupled to each element, means coupled to said winding means so as to form a plurality of word lines each of which couples a different plurality of elements constituting a plurality of multi-bit words, means also coupled to said winding means so as to form a plurality of sense-digit lines each coupling a plurality of elements on different word lines which represent the same respective bit of a word, driving means cooperating with said word lines and said sense-digit lines so as to permit applying a magnetic coercive effect sufficient to switch all of the elements coupled to a selected word line to one bistable state during a reading operation and selected ones of the elements coupled to the same word line to the other bistable state during a writing operation following after the reading operation while causing the states of the elements on unselected word lines to remain undisturbed during such reading and writing operations, means coupled to said sense-digit lines for selecting predetermined ones thereof so as to permit discrimination between output signals from elements corresponding to a selected one of the words on the selected word line and those corresponding to unselected words on the selected word line, and means also coupled to said sense-digit lines for causing elements of unselected words on the selected word line to be returned during said writing operation to the same bistable state in which they resided prior to said reading operation while permitting elements of the selected word on the selected word line to either be returned during said writing operation to the same bistable state in which they resided prior to said reading operation or to have new data written therein.

5. A thin film magnetic memory comprising: a plurality of parallel rod elements each being comprised of an inner substrate having a continuous thin film of bistable magnetic material thereon, winding means coupled to said rod elements so that predetermined portions of the thin films on said rod elements serve as bistable storage elements, means coupled to said winding means so as to form a plurality of word lines each of which couples a different plurality of bistable elements constituting a plurality of multi-bit words, means also coupled to said winding means so as to form a plurality of sense-digit lines each coupling a plurality of bistable elements on different word lines which represent the same respective bit of a word, driving means cooperating with said word lines and said sense-digit lines so as to permit applying a magnetic coercive effect sufficient to switch all of the bistable elements coupled to a selected word line to one bistable state during a reading operation and selected ones of the bistable elements coupled to the same word line to the other bistable state during a writing operation following after the reading operation while causing the states of the bistable elements on unselected word lines to remain undisturbed during such reading and writing operations, means coupled to said sense-light lines for selecting predetermined ones thereof so as to permit discrimination between output signals from bistable elements corresponding to a selected one of the words on the selected word line and those corresponding to unselected words on the selected word line, and means also coupled to said sense-digit lines for causing bistable elements of unselected words on the selected word line to be returned during said writing operation to the same bistable state in which they resided prior to said reading operation while permitting bistable elements of the selected word on the selected word line to either be returned during said writing operation to the same bistable state in which they reside prior to said reading operation or to have new data written therein.

6. A thin film magnetic rod memory comprising in combination: a matrix provided with a plurality of array solenoidal windings disposed in aligned fashion in a plurality of planes so as to form a three-dimensional array of windings in which the bores of respectively located windings in different planes are aligned and provide a continuous bore therethrough, said matrix also including a plurality of rod structures, each rod structure passing through the continuous bore formed by a respective group of aligned windings and having a continuous bistable thin film provided thereon exhibiting single domain switching characteristics and a rod solenoidal winding wound therealong, conductive means interconnecting said array solenoids in said matrix in a first predetermined pattern and said rod solenoids in said matrix in a second predetermined pattern so as to form a memory arrangement in which predetermined portions of the thin films on said rod structures serve as bistable storage elements, one of said first and second predetermined patterns being arranged to interconnect its respective windings so as to form a plurality of word lines each of which couples a different plurality of thin film rod elements constituting a plurality of multi-bit words, the other of said first and second predetermined patterns being arranged to interconnect its respective windings so as to form a plurality of sense-digit lines, each sense-digit line coupling a plurality of thin film rod elements on different word lines which represent the same respective bit of a word, selectively operable driving means cooperating with said word lines and said sense-digit lines so as to permit applying a magnetic coercive effect sufficient to switch all of the thin film rod elements coupled to a selected word line to one bistable state during a reading operation and selected ones of the thin film rod elements coupled to the same selected word line to the other bistable state during a writing operation following after the reading operation, the states of thin film rod elements on unselected word lines remaining undisturbed during such reading and writing operations, means coupled to said sense-digit lines for selecting predetermined ones thereof so as to permit discrimination between output signals from thin film rod elements corresponding to a selected one of the words on the selected word line and those corresponding to unselected words on the selected word line, and means also coupled to said sense-digit lines for causing thin film rod elements of unselected words on the selected word line to be returned during said writing operation to the same bistable state in which they resided prior to said reading operation while permitting thin film rod elements of the selected word on the selected word line to either be returned during said writing operation to the same bistable state in which they resided prior to said reading operation or to have new data written therein.

7. A thin film magnetic memory comprising in combination: a plurality of individual three-dimensional matrices, each matrix being provided with a plurality of array solenoidal windings disposed in aligned fashion in a plurality of planes so as to form a three-dimensional array of windings in which the bores of respectively located windings in different planes are aligned and provide a continuous bore therethrough, each matrix also including a plurality of rod structures, each rod structure passing through the continuous bore formed by a respective group of aligned windings and having a continuous bistable magnetic thin film provided thereon and a rod solenoidal winding wound therealong, conductive means interconnecting said array solenoids in all of said matrices including interconnections between array solenoids of said plurality of matrices in a first predetermined pattern and said rod solenoids in all of said matrices in a second predetermined pattern so as to form a composite memory arrangement of said plurality of matrices in said first and second predetermined patterns of array solenoids and rod solenoids in which predetermined portions of the thin films on said rod structures serve as bistable storage elements, one of said first and second predetermined patterns being arranged to interconnect its respective windings so as to form a plurality of word lines each of which couples a different plurality of thin film rod elements constituting a plurality of multi-bit words, the other of said first and second predetermined patterns being arranged to interconnect its respective windings so as to form a plurality of sense-digit lines, each sense-digit line coupling a plurality of thin film rod elements on different word lines which represent the same respective bit of a word, selectively operable driving means cooperating with said word lines and said sense-digit lines so as to permit applying a magnetic coercive effect sufficient to switch all of the thin film rod elements coupled to a selected word line to one bistable state during a reading operation and selected ones of the thin film rod elements coupled to the same selected word line to the other bistable state during a writing operation following after the reading operation while causing the states of thin film rod elements on unselected word lines to remain undisturbed during such reading and writing operations, means coupled to said sense-digit lines for selecting predetermined ones thereof so as to permit discrimination between output signals from thin film rod elements corresponding to a selected one of the words on the selected word line and those corresponding to unselected words on the selected word line, and means also coupled to said sense-digit lines for causing thin film rod elements of unselected words on the selected word line to be returned during said writing operation to the same bistable state in which they resided prior to said reading operation while permitting thin film rod elements of the selected word on the selected word line to either be returned during said writing operation to the same bistable state in which they resided prior to said reading operation or to have new data written therein.

8. A thin film magnetic memory comprising in combination: a plurality of individual three-dimensional matrices, each matrix being provided with a plurality of array solenoidal windings disposed in aligned fashion in a plurality of planes so as to form a three-dimensional array of windings in which the bores of respectively located windings in different planes are aligned and provide a continuous bore therethrough, each matrix also including a plurality of rod structures, each rod structure passing tightly through the continuous bore formed by a respective group of aligned windings and having an inner conductive substrate on which is provided a continuous bistable magnetic thin film having single domain switching properties, each rod structure having a diameter of the order of 5 to 50 mils and including a rod solenoidal winding wound along each rod and having one end thereof connected to one end of said inner conductive substrate, means interconnecting said array solenoids in all of said matrices including interconnecting array solenoids of different ones of said plurality of matrices so as to form a plurality of word lines each of which couples a different plurality of thin film rod elements on said rod structures, means interconnecting the other ends of said rod solenoidal windings and the other ends of said conductive substrates in all of said matrices so as to form a purality of sense-digit lines each of which couples a plurality of thin film rod elements on different word lines which represent the same respective bit of a word, said interconnections of array solenoids of different ones of said matrices and interconnections of said rod solenoidal windings forming an integral memory arrangement of said plurality of matrices, linear selection means coupled to said word lines for applying read and write currents to a selected word line during respective reading and writing operations, means coupled to said sense-digit lines for sensing the data read out from the thin film rod elements on the selected word line during reading, and means also coupled to said sense-digit lines for causing an aiding or opposing digit current to be applied to each of said sense-digit lines during writing.

9. A thin film magnetic memory comprising in combination: a plurality of matrices, each matrix being comprised of a plurality of high speed magnetic bistable elements each having a substantially square-loop hysteresis characteristic, a word winding and a sense-digit winding coupled to each element, means interconnecting the word windings of said bistable elements in each matrix and interconnecting word windings between matrices so as to form a plurality of word lines in an integral memory arrangement of said matrices, each word line coupling a different plurality of elements constituting a plurality of multi-bit words, means coupled to the sense-digit windings of said elements so as to form a plurality of sense-digit lines each coupling a plurality of elements on different word lines which represent the same respective bit of a word, each sense-digit line coupling elements from less than all of said matrices whereby a plurality of sense-digit lines is provided for each bit position which is greater than the number of multi-bit words in each word line, means coupled to the word lines of all of said matrices for applying read and write currents to a selected word line during respective reading and writing operations, means coupled to each sense-digit line for applying a digit current thereto in an opposing or an aiding direction with respect to said write current during a writing operation only if it couples an element on the selected word line, means including a sense amplifier also coupled to each sense-digit line for reading out a signal induced therein during a reading operation only if it couples an element on the selected word line, and logically controlled summing means coupled to said last-mentioned means for selecting predetermined ones of said sense-digit lines so as to permit selection of only the data read out from elements corresponding to bits of a selected one of the words on the selected word line.

10. A thin film magnetic memory comprising in combination: a plurality of matrices, each matrix being comprised of a plurality of thin film magnetic bistable elements each having a substantially square-loop hysteresis characteristic, a word winding and a sense-digit winding coupled to each element, means interconnecting the word windings of said bistable elements in each matrix and interconnecting word windings of said plurality of matrices so as to form a plurality of selectively accessible word lines for said memory, each word line coupling a different plurality of elements constituting a plurality of multi-bit words, means coupled to the sense-digit windings of said elements so as to form a plurality of sense-digit lines each coupling a plurality of elements on different word lines which represent the same respective bit of a word, each sense-digit line coupling elements from less than all of said matrices whereby a plurality of sense-digit lines is provided for each bit position which is in addition to that which would be required for the number of multi-bit words in each word line, the additional number of sense-digit lines provided for each bit position being chosen so that the number of elements coupled by each is reduced to an amount which will not interfere with memory cycle speed, means coupled to the word lines of all of said matrices of said memory for applying read and write currents to a selected word line during respective reading and writing operations, digit driver means coupled to each sense-digit line for applying a digit current thereto in an opposing or an aiding direction with respect to said write current during a writing operation only if it couples an element on the selected word line, output means including a sense amplifier also coupled to each sense-digit line for reading out a signal induced therein during a reading operation only if it couples an element on the selected word line, logically controlled summing means coupled to said output means for selecting predetermined ones of said sense-digit lines so as to permit selection of only the data read out from elements corresponding to bits of a selected one of the word on the selected word line, and control means coupled to said digit driver means for controlling the direction of digit current flow in each sense-digit line coupled to an element on the selected row line in dependence upon whether or not the element corresponds to a bit of the selected word.

11. The invention in accordance with claim 10, wherein said bistable elements and associated windings are formed of a plurality of rod structures having solenoidal windings thereon, each rod structure comprising an inner rod-like substrate having a magnetic bistable thin film deposited thereon exhibiting single domain switching characteristics.

12. The invention in accordance with claim 10, wherein each sense amplifier is constructed and arranged to remain inactive until a strobe pulse is applied thereto, said strobe pulse occurring during a reading operation and being applied to a sense amplifier only if its respective sense-digit line couples an element on the selected word line.

13. The invention in accordance with claim 12, wherein said output means also includes a pulse stretcher coupled to the output of said sense amplifier for stretching the sense amplifier output signal so that it will extend into the writing period, and wherein said control means is constructed and arranged so as to control the direction of digit current flow during writing in response to either the output of said pulse stretcher or an external signal.

14. A high speed memory for use in a data processor, capable of receiving data from and applying data to said memory, and also capable of providing memory timing signals, memory address signals, and read-restore and clear-write signals to said memory to control the operation thereof, said memory comprising in combination: a plurality of high speed magnetic bistable elements each having a substantially square-loop hysteresis characteristic, winding means coupled to each element, means coupled to said winding means so as to form a plurality of word lines each of which couples a different plurality of elements constituting a plurality of multi-bit words, means also coupled to said winding means so as to form a plurality of sense-digit lines each coupling a plurality of bistable elements on different word lines which represent the same respective bit of a word, driving means cooperating with said word lines and said sense-digit lines so as to permit applying a magnetic coercive effect sufficient to switch all of the bistable elements coupled to a selected word line to one bistable state during a reading operation and selected ones of the elements coupled to the same word line to the other bistable state during a writing operation following thereafter, the time of occurrence of said reading and writing operations being controlled by said memory timing signals and the selected word line being determined in accordance with predetermined ones of said memory address signals, means coupled to said sense-digit lines and responsive to predetermined ones of said memory address signals for selecting predetermined ones of said sense-digit lines so as to permit only output singals from bistable elements corresponding to a selected one of the words on the selected word line to be fed to said data processor, and means also coupled to said sense-digit lines and responsive to said read-restore and clear-write signals and to predetermined ones of said memory address signals for causing bistable elements of unselected words on the selected word line to be returned during said writing operation to the same bistable state in which they resided prior to said reading operation while permitting bistable elements of the selected word on the selected word line to be returned during said writing operation to the same bistable state in which they resided prior to said reading operation in response to said read-restore signal or to have new data written therein from said data processor in response to said clear-write signal.

15. A thin film memory for use in a data processor capable of receiving data from and applying data to said memory, and capable of providing memory timing signals, memory address signals, and read-restore and clear-write signals to said memory to control the operation thereof, said memory comprising in combination: a plurality of individual three-dimensional matrices, each matrix being provided with a plurality of array solenoidal windings disposed in aligned fashion in a plurality of planes so as to form a three-dimensional array of windings in which the bores of respectively located windings in different planes are aligned and provide a continuous bore therethrough, each matrix also including a plurality of parallel rod structures, each rod structure passing tightly through the continuous bore formed by a respective group of aligned windings and having an inner conductive substrate on which is provided a continuous bistable magnetic thin film having single domain switching properties, each rod structure having a diameter of the order of 5 to 50 mils and including a rod solenoidal winding wound along each rod and having one end thereof connected to one end of said inner conductive substrate, means interconnecting said array solenoids in all of said matrices including interconnecting array solenoids of different ones of said matrices so as to form a plurality of word lines each of which couples a different plurality of thin film rod elements on said rod structures, means interconnecting the other ends of said rod solenoidal windings and the other ends of said conductive substrates in all of said matrices so as to form a plurality of sense-digit lines each of which couples a plurality of thin film rod elements on different word lines which represent the same respective bit of a word, each sense-digit line coupling elements from less than all of said matrices whereby a plurality of sense-digit lines is provided for each bit position which is in addition to that which would be required for the number of multi-bit word in each word line, the additional number of sense-digit lines provided for each bit position being chosen so that the number of elements coupled by each is reduced to an amount which will not interfere with the memory cycle speed, linear selection means responsive to predetermined ones of said memory timing signals and said memory address signals for applying during a reading operation a read current to a selected word line which is sufficient to switch all of the elements on the selected word line to one bistable state and for applying during a writing operation a write current to the same selected word line which by itself is insufficient to cause switching, digit driver means coupled to each sense-digit line and responsive to predetermined ones of said memory address signals and said memory timing signals for applying during said writing operation a digit current to its respective sense-digit line in an opposing or aiding direction with respect to said write current only if it couples an element on the selected word line, the combination of a write current and an aiding digit current being sufficient to switch an element to the other bistable state but neither alone being capable of providing switching, output means including a sense amplifier and a pulse stretcher coupled to each sense-digit line and cooperating with said digit driver means so as to provide common mode noise rejection, said sense amplifier being responsive to an output signal induced in its respective sense-digit line but remaining inactive until a strobe pulse derived from said memory timing signals and occurring during said reading operation is applied thereto, said strobe pulse cooperating with predetermined ones of said memory address signals so that it will be applied to a sense amplifier only if its sense-digit line couples an element on the selected word line, said pulse stretcher being coupled to the output of said sense amplifier for stretching the sense amplifier output signal so that it will extend into the writing period, logical summing means coupled to the pulse stretchers and responsive to predetermined ones of said memory address signals so as to permit only output signals from elements corresponding to a selected one of the words on the selected word line to be fed to said data processor, and control means coupled between each pulse stretcher and digit driver and responsive to said read-restore and clear-write signals and to predetermined ones of said memory address signals for controlling the direction of digit current flow provided by its respective digit driver means in a manner so that elements of unselected words on the selected word line will be returned during said writing operation to the same bistable state in which they resided prior to said reading operation while permitting elements of the selected word on the selected word line to be returned during said writing operation to the same bistable state in which they resided prior to said reading operation in response to said read-restore signal or to have new data written therein from said data processor in response to said clear-write signal.

References Cited

UNITED STATES PATENTS

| | | | |
|---|---|---|---|
| 3,341,829 | 9/1967 | Meier | 340—174 |
| 3,000,004 | 9/1961 | Weller | 340—174 |
| 3,069,661 | 12/1962 | Gianola | 340—174 |
| 3,299,412 | 1/1967 | Pick | 340—174 |
| 3,334,335 | 8/1967 | Brick et al. | 340—174 X |
| 3,351,922 | 11/1967 | Snyder | 340—174 |

STANLEY M. URYNOWICZ, Jr., *Primary Examiner.*